(No Model.)

G. D. WOODWORTH.
CIGAR BOX OPENER.

No. 408,565. Patented Aug. 6, 1889.

Witnesses:
Robt. F. Gaylord
Frank E. Hartley

Inventor
George D. Woodworth
By Duncan Curtis & Page
Attorneys.

UNITED STATES PATENT OFFICE.

GEORGE D. WOODWORTH, OF BROOKLYN, NEW YORK.

CIGAR-BOX OPENER.

SPECIFICATION forming part of Letters Patent No. 408,565, dated August 6, 1889.

Application filed April 4, 1889. Serial No. 306,002. (No model.)

*To all whom it may concern:*

Be it known that I, GEORGE D. WOODWORTH, of Brooklyn, in the county of Kings and State of New York, have invented certain new and useful Improvements in Cigar-Box Openers, of which the following is a full, clear, and exact description, reference being had to the accompanying drawings.

The present invention relates to improvements in tools for opening the lids of cigar-boxes—that is, to a tool adapted to cut the labels or corner-binding papers of the boxes, to pry the lids open, and to extract nails or to drive them.

The invention consists of a tool having a suitable handle provided with a knife-like blade, the edge of which is of a partially-circular form.

It also consists of a knife having a circular prying-edge and also provided with a hammer-head and claw adapted in shape to drive and pull nails.

Figure 1:
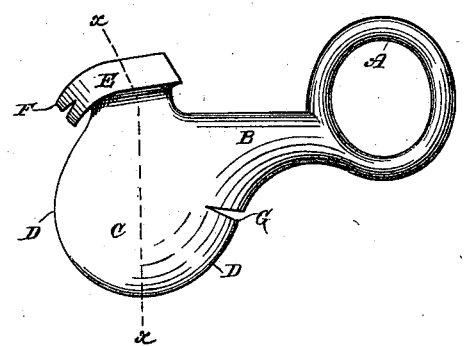
Figure 2:
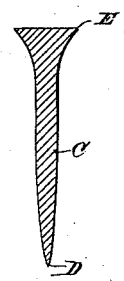

Referring to the drawings, Figure 1 is a perspective view of a tool embodying my improvements, Fig. 2 being a cross-section of the same on plane $x\ x$.

In the views, A represents the handle of the tool. As illustrated this handle consists of a practically round ring attached to a shank part B, and of suitable size to be readily grasped and held in the hand, as also to permit the finger of the operator to pass through it for convenience in handling or to hang the tool. This handle, however, and the shank part thereof may be of any other suitable form. It may also be engraved or stamped or provided with any desirable design.

C is the blade of the tool. This blade projects somewhat laterally or sidewise from the handle parts of the tool into substantially a circular form. This rounded part is thinned down to a blunt edge D, which, however, is sharp enough to serve for cutting labels and to be readily entered between the lid and the sides of the box for prying up the lid.

E is a head for driving nails. This head is also provided with a claw F for drawing nails. G is a slot in the edge of the blade, by which nails may also be seized to withdraw them.

In using the tool the rounded blade portion will serve to cut the labels on the box, and by its peculiar shape and position relatively to the handle it will be found particularly adapted to follow the junctional parts of the top and sides of a cigar-box and cut the labels and paper coverings without tearing them; also, howsoever the tool ordinarily may be grasped, the blade part thereof will be found convenient for immediate use—that is, it is not required that the tool be always handled in any particular manner. The shape of the edge portion of the blade also permits the tool to be turned or rocked as it is drawn along a label, and this effects a cleaner cut than is produced by a straight edge, and thereby leaves the cut labels less ragged and the opened boxes less marred.

In prying up the lid of a cigar-box this form of opener is particularly convenient, for by its shape it can be rocked or turned so as to produce a gradual prying up of the lid and obviate forcing the same so suddenly as to split it, and it cannot be forced so far under the lid as to tend to cut or tear the flap of the box.

The hammer-head and claw are preferably arranged opposite the circular edge, so that by simply turning the tool in the hand this head is brought into position for use either to draw or to drive nails. The slot in the edge of the blade is also a convenience in drawing nails or for working the edge around the nails when the lid of a box is being forced.

I do not confine myself to the exact form of tool herein shown and described, as obviously the parts may be slightly altered without materially interfering with the convenience of the tool. Thus, while I have described the edge of the tool as circular, it may be instead of an oval or similar form and yet serve as well as a strictly circular form; but any such modified construction I regard as substantially the same as the form I have described.

I am aware that cigar-box openers have been made consisting of a straight parallel-edged blade having a rounded end, and that such blades have been provided with hammer-heads and slots in one edge for withdrawing nails, and this form of opener I do not claim. My opener differs from such openers in the essential respects that the cutting and prying edge is of a substantially circular form and projects laterally or sidewise from the handle parts, whereby the blade projects to one side beyond the fingers of the operator when the tool is grasped and is in convenient position for sidewise application. The nail-slot, claw, and hammer-head on a tool thus shaped are also more conveniently applied and more effectively used.

What is claimed as new is—

1. A cigar-box opener consisting of a handle attached to a shank B, and a semicircular blade springing from one edge of said shank and extending substantially at right angles or laterally thereto and returning or curving back into the opposite edge of the shank, as set forth.

2. A cigar-box opener composed of a handle attached to shank B, a circularly-shaped blade C, extending substantially at right angles or laterally thereto, and a hammer-head E, provided with claw F, as set forth.

3. A cigar-box opener composed of a handle attached to a shank B, a circularly-shaped blade C, extending substantially at right angles or laterally therefrom, and a hammer-head arranged oppositely to the cutting-edge of said blade C, and having a claw F, as set forth.

4. A cigar-box opener composed of a handle attached to a shank B, a semicircular blade C, extending substantially at right angles therefrom, a slot G, formed in said blade at some suitable point, and hammer-head E, arranged oppositely to the cutting-edge of said blade C, and having a claw F, as set forth.

GEORGE D. WOODWORTH.

Witnesses:
ROBT. F. GAYLORD,
FRANK E. HARTLEY.